(12) United States Patent  
Wolf

(10) Patent No.: US 9,158,990 B2  
(45) Date of Patent: Oct. 13, 2015

(54) SYSTEM, METHOD AND COMPUTER PROGRAM PRODUCT FOR MOTION DETECTION USING SETS OF TRINARY BITS

(75) Inventor: Lior Wolf, Herzliya (IL)

(73) Assignee: RAMOT AT TEL-AVIV UNIVERSITY LTD., Tel-Aviv (IL)

( * ) Notice: Subject to any disclaimer, the term of this patent is extended or adjusted under 35 U.S.C. 154(b) by 765 days.

(21) Appl. No.: 13/497,263

(22) PCT Filed: Sep. 21, 2010

(86) PCT No.: PCT/IB2010/054265  
§ 371 (c)(1),  
(2), (4) Date: May 28, 2012

(87) PCT Pub. No.: WO2011/036625  
PCT Pub. Date: Mar. 31, 2011

(65) Prior Publication Data  
US 2012/0224638 A1    Sep. 6, 2012

Related U.S. Application Data

(60) Provisional application No. 61/244,930, filed on Sep. 23, 2009.

(51) Int. Cl.
| | |
|---|---|
| *H04N 11/02* | (2006.01) |
| *G06K 9/46* | (2006.01) |
| *G06K 9/00* | (2006.01) |
| *G06K 9/68* | (2006.01) |

(Continued)

(52) U.S. Cl.  
CPC .......... *G06K 9/4642* (2013.01); *G06K 9/00335* (2013.01); *G06K 9/6857* (2013.01); *G06T 7/20* (2013.01); *G06T 2207/20021* (2013.01); *H04N 19/503* (2014.11)

(58) Field of Classification Search  
USPC ........................................ 375/240.01–240.29  
See application file for complete search history.

(56) References Cited

U.S. PATENT DOCUMENTS

| | | | | |
|---|---|---|---|---|
| 5,936,672 | A * | 8/1999 | Ahnn | 375/240.17 |
| 6,683,982 | B1 * | 1/2004 | Kohn | 382/167 |

(Continued)

OTHER PUBLICATIONS

Guoying Zhao et al: "Dynamic Texture Recognition Using Local Binary Patterns with an Application to Facial Expressions", Pattern Analysis and Machine Intelligence, IEEE Transactions on, IEEE Service Center, Los Alamitos, CA, US, vol. 29, No. 6, Jun. 1, 2007, pp. 915-928, XP011179655, ISSN: 0162-8828, DOI: 10.1109/TPAMI.2007.1110.

(Continued)

*Primary Examiner* — Dave Czekaj  
*Assistant Examiner* — Leron Beck  
(74) *Attorney, Agent, or Firm* — Reches Patents

(57) ABSTRACT

A system, computer readable medium and a method for motion detection, the method includes: receiving multiple frames; generating a set of digits for each pixel of multiple pixels of each frame of the multiple frames; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of digits to detect motion.

15 Claims, 11 Drawing Sheets

(51) Int. Cl.
*G06T 7/20* (2006.01)
*H04N 19/503* (2014.01)

(56) References Cited

U.S. PATENT DOCUMENTS

| | | | |
|---|---|---|---|
| 2006/0013481 A1* | 1/2006 | Park et al. | 382/170 |
| 2008/0170626 A1 | 7/2008 | Sung et al. | |
| 2008/0175489 A1* | 7/2008 | Lee et al. | 382/232 |

OTHER PUBLICATIONS

Shengping Zhang et al: "Dynamic background modeling and subtraction using spatio-temporal local binary patterns", Image Processing, 2008. ICIP 2008. 15th IEEE International Conference, IEEE, Piscataway, NJ, USA, Oct. 12, 2008, pp. 1556-1559, XP031636378, ISBN: 978-1-4244-1765-0.

* cited by examiner

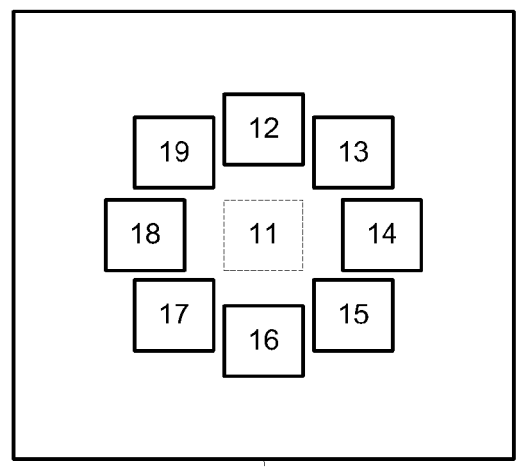
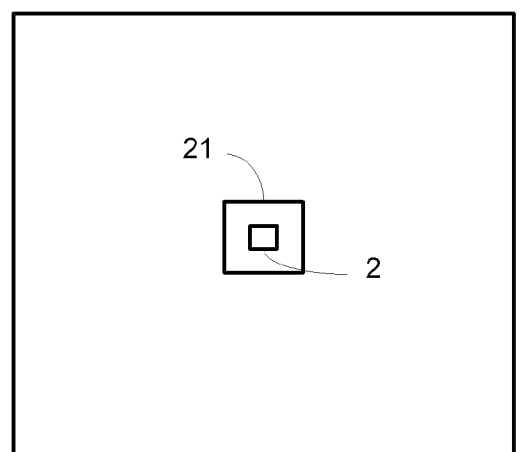
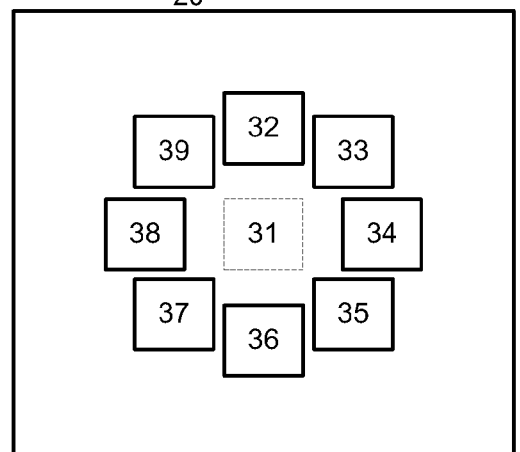
FIG. 5

SYSTEM, METHOD AND COMPUTER PROGRAM PRODUCT FOR MOTION DETECTION USING SETS OF TRINARY BITS

RELATED APPLICATIONS

This application claims priority from U.S. provisional patent application Ser. No. 61/244,930 filing date 23 Sep. 2010 which is incorporated herein by its entirety.

BACKGROUND OF THE INVENTION

Human action recognition from video is an area of immense importance to visual surveillance, video indexing, and several other computer-vision domains. Despite of extensive research, fueled by the ongoing advancements in object recognition, the gap between the current capabilities and the applications' needs remains large.

Indeed, action recognition is challenging due to substantial variations in the video data that are caused by varying factors which include viewpoint and scale, clothing and the subject's appearance, personal style and action length, self-occlusion, multiple video objects, and background clutter.

Beyond recognition accuracy, there are other constraints on the design of action recognition methods. Ideally for several applications, such methods would work efficiently in an online manner, and require simultaneous detection of action at several possible time scales (different action lengths) and for every possible starting point.

SUMMARY OF THE INVENTION

A method for motion detection, the method may include: receiving multiple frames; generating a set of digits for each pixel of multiple pixels of each frame of the multiple frames; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of digits to detect motion.

The method may include generating sets of trinary digits.

The each trinary digit of the set of trinary digits may represent a relationship between (a) a first similarity between the patch and a next patch of the set of patches of the next frame; and (b) a second similarity between the patch and a previous patch of the set of patches of the previous frame, wherein the next patch and the previous patch are located at the same location.

The method may include: assigning a first value to the trinary digit if the first similarity may be more significant that the second similarity; assigning a second value to the trinary digit if the second similarity may be more significant that the first similarity; and assigning a third value to the trinary digit if the first similarity may be substantially equal to the second similarity.

The method may include: assigning a positive value to the trinary digit if the first similarity may be more significant that the second similarity; assigning a negative value to the trinary digit if the second similarity may be more significant that the first similarity; and assigning a zero value to the trinary digit if the first similarity may be substantially equal to the second similarity.

The method may include: generating positive sets of binary digits by zeroing negative trinary digits; generating negative sets of binary digits by zeroing positive trinary digits; and calculating histograms that represent values of positive sets of binary digits and represent values of negative sets of binary digits.

The method may include calculating the histograms for each sub-frame of each frame.

The method may include calculating a data structure that represents the values of the histograms of each sub-frame; and applying a classifier on the data structure to detect motion.

The method may include calculating the histograms for each sub-frame of each frame.

The method may include calculating a data structure that represents the values of the histograms of each sub-frame; and applying a classifier on the data structure to detect motion.

The classifier may be a linear Support Vector Machine (SVM) classifier and wherein the first similarities are calculated by applying a Sum of Square Differences (SSD) function on pixels of patches.

The each set of trinary may represent a pixel that belongs to a patch of a frame and represents relationships between (a) first similarities between the patch and a set of patches of the next frame that differ from each other and surround a location that corresponds to the location of the pixel; and (b) second similarities between the patch and a set of patches of the previous frame differ from each other and surround a location that corresponds to the location of the pixel.

The method may include generating a set of trinary digits for each pixel of multiple pixels of each frame of each sub-set of frames out of multiple sub-sets of the multiple frames; and processing the sets of trinary digits to locate motion at each of the sub-sets of frames.

The processing may include calculating an aggregate of histograms of values of sub-frames of a group of frames; receiving a new frame; calculating histograms of values of sub-frames of the new frame; updating the aggregate of histograms by deleting from the aggregate histograms values of oldest sub-frames of the group of frames and adding to the aggregate the histograms of values of sub-frames of the new frame.

The method may include generating a first set and a second set of binary digits for each pixel of multiple pixels of each frame of the multiple frames; wherein a combination of the first set and the second set of binary digits represent a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of trinary digits to detect motion.

Each pair of first set binary digit and second set binary digit that are associated with the same pixel may represent a relationship between (a) a first similarity between the patch and a next patch of the set of patches of the next frame; and (b) a second similarity between the patch and a previous patch of the set of patches of the previous frame, wherein the next patch and the previous patch are located at the same location.

The method may include assigning a first value to the first set binary digit if the first similarity may be substantially equal to the second similarity; assigning a second value to the first set binary digit if the first similarity substantially differs from the second similarity; assigning a first value to the second set binary digit if the second similarity may be more significant that the first similarity; and assigning a second value to the second set binary digit if the second similarity may be less significant that the first similarity.

A system may be provided. The system may include: an interface for receiving multiple frames; a generator adapted to generate a set of digits for each pixel of multiple pixels of each frame of the multiple frames; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and a motion detector for processing the sets of digits to detect motion.

The generator may be a trinary generator adapted to generate a set of trinary digits for each pixel of multiple pixels of each frame of the multiple frames; wherein each set of trinary digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch.

Each trinary digit of the set of trinary digits may represent a relationship between (a) a first similarity between the patch and a next patch of the set of patches of the next frame; and (b) a second similarity between the patch and a previous patch of the set of patches of the previous frame, the next patch and the previous patch are located at the same location.

The trinary generator may be arranged to assign a first value to the trinary digit if the first similarity may be more significant that the second similarity; assign a second value to the trinary digit if the second similarity may be more significant that the first similarity; and assign a third value to the trinary digit if the first similarity may be substantially equal to the second similarity.

The trinary generator may be arranged to assign a positive value to the trinary digit if the first similarity may be more significant that the second similarity; assign a negative value to the trinary digit if the second similarity may be more significant that the first similarity; and assign a zero value to the trinary digit if the first similarity may be substantially equal to the second similarity.

The system may include a mapping circuit that may be arranged to generate positive sets of binary digits by zeroing negative trinary digits; generate negative sets of binary digits by zeroing positive trinary digits; the system further comprises a histogram calculator that may be adapted to calculate histograms that represent values of positive sets of binary digits and represent values of negative sets of trinary digits.

The histogram calculator may be arranged to calculate the histograms for each sub-frame of each frame.

The system may include a pre-processor and a classifier; the pre-processor may be arranged to calculate a data structure that may represent the values of the histograms of each sub-frame; and the classifier may be arranged to classify the data structure to detect motion.

The system may include a histogram calculator that may be arranged to calculate the histograms for each sub-frame of each frame.

The system may include a pre-processor and a classifier; the pre-processor may be arranged to calculate a data structure that may represent the values of the histograms of each sub-frame; and the classifier may be arranged to classify the data structure to detect motion The classifier may be a linear Support Vector Machine (SVM) classifier and the trinary generator may be arranged calculate the first similarities by applying a Sum of Square Differences (SSD) function on pixels of patches.

Each set of trinary may represent a pixel that belongs to a patch of a frame and may represent relationships between (a) first similarities between the patch and a set of patches of the next frame that differ from each other and surround a location that corresponds to the location of the pixel; and (b) second similarities between the patch and a set of patches of the previous frame differ from each other and surround a location that corresponds to the location of the pixel.

The trinary generator may be arranged to generate a set of trinary digits for each pixel of multiple pixels of each frame of each sub-set of frames out of multiple sub-sets of the multiple frames; and the motion detector may be arranged to process the sets of trinary digits to locate motion at each of the sub-sets of frames.

The histogram calculator may be arranged may be arranged to calculate an aggregate of histograms of values of sub-frames of a group of frames; to receive a new frame; to calculate histograms of values of sub-frames of the new frame; and to update the aggregate of histograms by deleting from the aggregate histograms values of oldest sub-frames of the group of frames and adding to the aggregate the histograms of values of sub-frames of the new frame.

The generator may be a pair generator arranged to generate a first set and a second set of binary digits for each pixel of multiple pixels of each frame of the multiple frames; a combination of the first set and the second set of binary digits represent a pixel that belongs to a patch of a frame and may represent relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of trinary digits to detect motion.

Each pair of first set binary digit and second set binary digit that are associated with the same pixel represent a relationship between (a) a first similarity between the patch and a next patch of the set of patches of the next frame; and (b) a second similarity between the patch and a previous patch of the set of patches of the previous frame, the next patch and the previous patch are located at the same location.

The pair generator may be arranged to assign a first value to the first set binary digit if the first similarity may be substantially equal to the second similarity; assign a second value to the first set binary digit if the first similarity substantially differs from the second similarity; assign a first value to the second set binary digit if the second similarity may be more significant that the first similarity; and assign a second value to the second set binary digit if the second similarity may be less significant that the first similarity.

A non-transitory computer readable medium that stores instructions for: receiving multiple frames; generating a set of digits for each pixel of multiple pixels of each frame of the multiple frames; each set of digits may represent a pixel that belongs to a patch of a frame and may represent relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of digits to detect motion.

The non-transitory computer readable medium may also store instructions for generating sets of trinary digits.

Each trinary digit of the set of trinary digits may represent a relationship between (a) a first similarity between the patch and a next patch of the set of patches of the next frame; and (b) a second similarity between the patch and a previous patch of the set of patches of the previous frame, the next patch and the previous patch are located at the same location.

The non-transitory computer readable medium may further store instructions for: assigning a first value to the trinary digit if the first similarity may be more significant that the second similarity; assigning a second value to the trinary digit if the second similarity may be more significant that the first similarity; and assigning a third value to the trinary digit if the first similarity may be substantially equal to the second similarity.

The non-transitory computer readable medium may further store instructions for: assigning a positive value to the trinary digit if the first similarity may be more significant that the second similarity; assigning a negative value to the trinary digit if the second similarity may be more significant that the first similarity; and assigning a zero value to the trinary digit if the first similarity may be substantially equal to the second similarity.

The non-transitory computer readable medium may further store instructions for: generating positive sets of binary digits by zeroing negative trinary digits; generating negative sets of binary digits by zeroing positive trinary digits; and calculating histograms that represent values of positive sets of binary digits and represent values of negative sets of trinary digits.

The non-transitory computer readable medium may further store instructions for calculating the histograms for each sub-frame of each frame.

The non-transitory computer readable medium may further store instructions for calculating a data structure that may represent the values of the histograms of each sub-frame; and applying a classifier on the data structure to detect motion.

The non-transitory computer readable medium further storing instructions for calculating the histograms for each sub-frame of each frame.

The non-transitory computer readable medium may further store instructions for calculating a data structure that may represent the values of the histograms of each sub-frame; and applying a classifier on the data structure to detect motion.

The non-transitory computer readable medium may further store instructions for performing a linear Support Vector Machine (SVM) classification and for calculating similarities by applying a Sum of Square Differences (SSD) function on pixels of patches.

Each set of trinary may represent a pixel that belongs to a patch of a frame and may represent relationships between (a) first similarities between the patch and a set of patches of the next frame that differ from each other and surround a location that corresponds to the location of the pixel; and (b) second similarities between the patch and a set of patches of the previous frame differ from each other and surround a location that corresponds to the location of the pixel.

The non-transitory computer readable medium may further store instructions for: generating a set of trinary digits for each pixel of multiple pixels of each frame of each sub-set of frames out of multiple sub-sets of the multiple frames; and processing the sets of trinary digits to locate motion at each of the sub-sets of frames.

The non-transitory computer readable medium may further store instructions for calculating an aggregate of histograms of values of sub-frames of a group of frames; receiving a new frame; calculating histograms of values of sub-frames of the new frame; updating the aggregate of histograms by deleting from the aggregate histograms values of oldest sub-frames of the group of frames and adding to the aggregate the histograms of values of sub-frames of the new frame.

The non-transitory computer readable medium may further store instructions for generating a first set and a second set of binary digits for each pixel of multiple pixels of each frame of the multiple frames; a combination of the first set and the second set of binary digits represent a pixel that belongs to a patch of a frame and may represent relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of trinary digits to detect motion.

The non-transitory computer readable medium, each pair of first set binary digit and second set binary digit that are associated with the same pixel represent a relationship between (a) a first similarity between the patch and a next patch of the set of patches of the next frame; and (b) a second similarity between the patch and a previous patch of the set of patches of the previous frame, the next patch and the previous patch are located at the same location.

The non-transitory computer readable medium may further store instructions for: assigning a first value to the first set binary digit if the first similarity may be substantially equal to the second similarity; assigning a second value to the first set binary digit if the first similarity substantially differs from the second similarity; assigning a first value to the second set binary digit if the second similarity may be more significant that the first similarity; and assigning a second value to the second set binary digit if the second similarity may be less significant that the first similarity.

BRIEF DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

FIG. 5 illustrates three frames and multiple patches within these frames according to an embodiment of the invention;

FIG. 6 illustrates a frame that is partitioned to multiple sub-frames according to an embodiment of the invention;

DETAILED DESCRIPTION OF THE DRAWINGS

Figure 1:
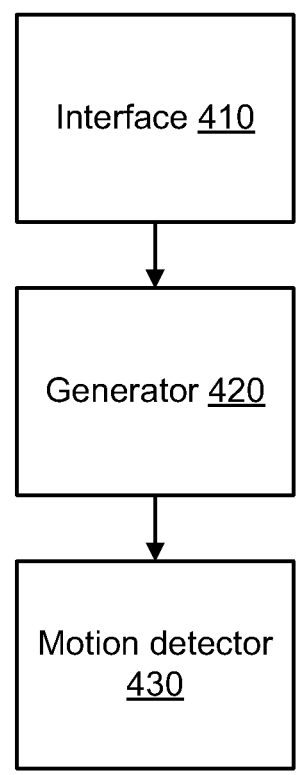
FIG. 1 illustrates a system according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Disclosed are methods for action recognition (which may be used for recognition of motion in humans, in animals, in machines, in inanimate objects, in nature, and so forth). The methods are based on combining the effective description properties of Local Binary Patterns with the appearance invariance and adaptability of patch matching based methods. The resulting methods are extremely efficient, and thus are suitable for real-time uses of simultaneous recovery of human action of several lengths and starting points. Tested on all publicity available datasets in the literature known to us, our system repeatedly achieves state of the art performance. Lastly, we present a new benchmark that focuses on uncut motion recognition in broadcast sports video. The motion is can be recognized in the sense that the method and system will provide an indication whether motion exists or not.

All of the disclosed methods and variations of which may be also implemented by systems—e.g. general purpose computer or dedicated systems (e.g. used for surveillance). Such system may include a camera, or may receive the video from an external source (e.g. over a network connection), and should have a processor configured to process sets of images/video streams as disclosed below, as well as an output interface for providing the results and/or a memory interface for storing the results.

The invention may also be implemented as a not transitory computer readable medium, having a computer readable code embodied therein for action recognition, the computer readable code including instructions for the executing of stages of the methods disclosed below by one or processors.

According to an embodiment of an invention motion is detected by a method that includes: (a) encoding every pixel at every frame as a short string of trinary digits (trits) by a process which compares this frame to the previous and to the next frame; (b) dividing the frame into regions (sub-frames), (c) computing histograms of the trinary strings each of the region, (d) accumulating these histograms every few frames and (e) generating a video descriptor of these few frames. The video descriptor is a data structure (such as a vector) that includes all concatenated histograms. Multiple such vectors are concatenated to represent longer videos.

The encoding process of the pixels may be based on comparing nearby patches, in a manner inspired by the self-similarity approach. For every pixel of every frame, a small patch centered at this pixel is compared to shifted patches in the previous and in the next frame. In a manner pertaining to the Local Binary Pattern approach, one trit of information is used to describe the relative similarity of the two patches to the patch in the central frame and indicates whether (i) the shifted patch in the previous frame is more similar to the central one, (ii) the patch in the next frame shifted by the same amount is more similar, or (iii) both are approximately comparable in their similarity.

The method is extremely efficient, it can be computed in an online manner, it requires no additional blocks such as optical-flow computation, and it exclusively encodes motion while disregarding all appearance information The method can be applied for real-time uses of simultaneous recovery of human action of several lengths and starting points. Tested on all publicity available datasets in the literature, the method repeatedly achieved state of the art performance.

FIG. 1 illustrates system 400 according to an embodiment of the invention.

System 400 may include (a) an interface 410 for receiving multiple frames; (b) a generator 420 adapted to generate a set of digits for each pixel of multiple pixels of each frame of the multiple frames; wherein each set of digits represents a pixel that belongs to a patch of a frame and represents relationships between (i) first similarities between the patch and a set of patches of a next frame that are located in locations that differ from each other and differ from a location of the patch; and (ii) second similarities between the patch and a set of patches of a previous frame that are located in locations that differ from each other and differ from a location of the patch; and (c) a motion detector 430 for processing the sets of digits to detect motion.

Figure 2:
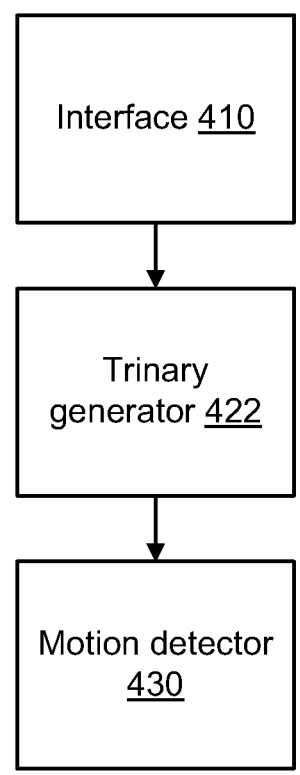
FIG. 2 illustrates a system according to an embodiment of the invention.
Figure 3:
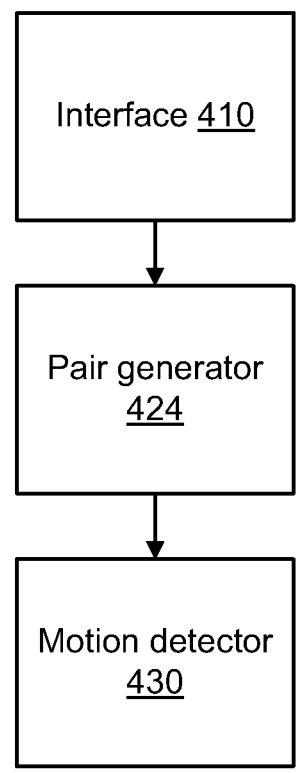
FIG. 3 illustrates a system according to an embodiment of the invention.

The generator 420 may be a pair generator (as illustrated in FIG. 3) or a trinary generator (as illustrated in FIG. 2).

FIG. 2 illustrates a system 402 in which the generator is a trinary generator 422 that is adapted to generate a set of trinary digits for each pixel of multiple pixels of each frame of the multiple frames; wherein each set of trinary digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch.

Each trinary digit of the set of trinary digits may represent a relationship between (a) a first similarity between the patch and a next patch (Pnext) of the set of patches of the next frame; and (b) a second similarity between the patch and a previous patch (Pprev) of the set of patches of the previous frame, wherein the next patch (Pnext) and the previous patch (Pprev) are located at the same location.

The trinary generator 422 may be arranged to assign a first value to the trinary digit if the first similarity is more significant that the second similarity; assign a second value to the trinary digit if the second similarity is more significant that the first similarity; and assign a third value to the trinary digit if the first similarity is substantially equal to the second similarity—if, for example, the difference between the first and second similarities is below a threshold.

The trinary generator 422 may be arranged to (a) assign a positive value to the trinary digit if the first similarity is more significant that the second similarity; (b) assign a negative value to the trinary digit if the second similarity is more significant that the first similarity; and (c) assign a zero value to the trinary digit if the first similarity is substantially equal to the second similarity.

The trinary generator 422 may be arranged to calculate the first similarities by applying a Sum of Square Differences (SSD) function on pixels of patches.

Referring to the example set forth in FIG. 5, the trinary generator 422 can generate, for pixel 2 of patch 21, a set of trinary digits that includes eight trinary digits—indicative of the relationship between patch 21 and the eight pairs of corresponding patches {(12, 32), (13,33), (14,34), (15,35), (16, 36), (17,37), (18, 38) and (19,39)} of previous frame 10 and next frame 30. These corresponding patches of each frame surround a location that corresponds to the location of the pixel. It is noted that these patches can be non-overlapping or partially overlapping.

Figure 7:
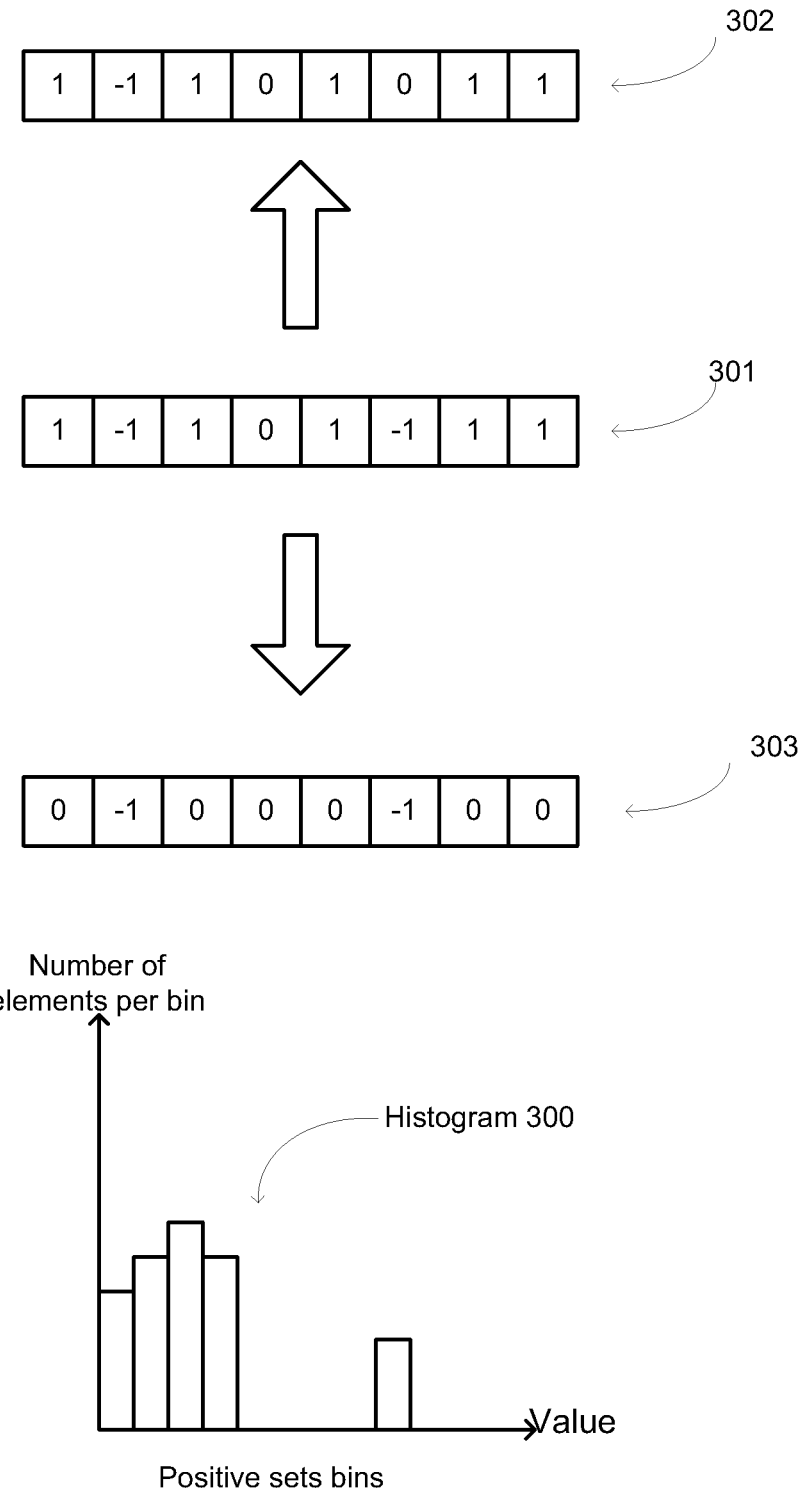
FIG. 7 illustrates a histogram, a set of trinary digits, a positive set of binary digits and a negative set of binary digits, according to an embodiment of the invention.

Referring to the example set fourth in FIG. 7, a set 301 of trinary digits that includes the values 1, −1, 1,0,1,−1,1,1 indicates that (a) patch 12 is more similar to patch 21 than patch 32, (b) patch 33 is more similar to patch 21 than patch 13, (c) patch 14 is more similar to patch 21 than patch 34, (d) patches 15 and 25 are substantially similar to each other, (e) patch 16 is more similar to patch 21 than patch 36, (f) patch 37 is more similar to patch 21 than patch 17, (g) patch 18 is more similar to patch 21 than patch 38, and (h) patch 19 is more similar to patch 21 than patch 39.

Each frame can be partitioned to sub-frames and the motion detection can be based upon the content of these sub-frames.

When the frame is partitioned on sub-frames, either one of the following or a combination thereof can be occur: (a) the trinary generator 422 may be arranged to generate a set of trinary digits for each pixel of multiple pixels of each frame of each sub-set of frames, (b) the motion detector 430 may be arranged to process the sets of trinary digits to locate motion at each of the sub-sets of frames, and (c) the histogram calculator 464 may be arranged to calculate an aggregate of histograms of values of sub-frames of a group of frames.

Figure 4:
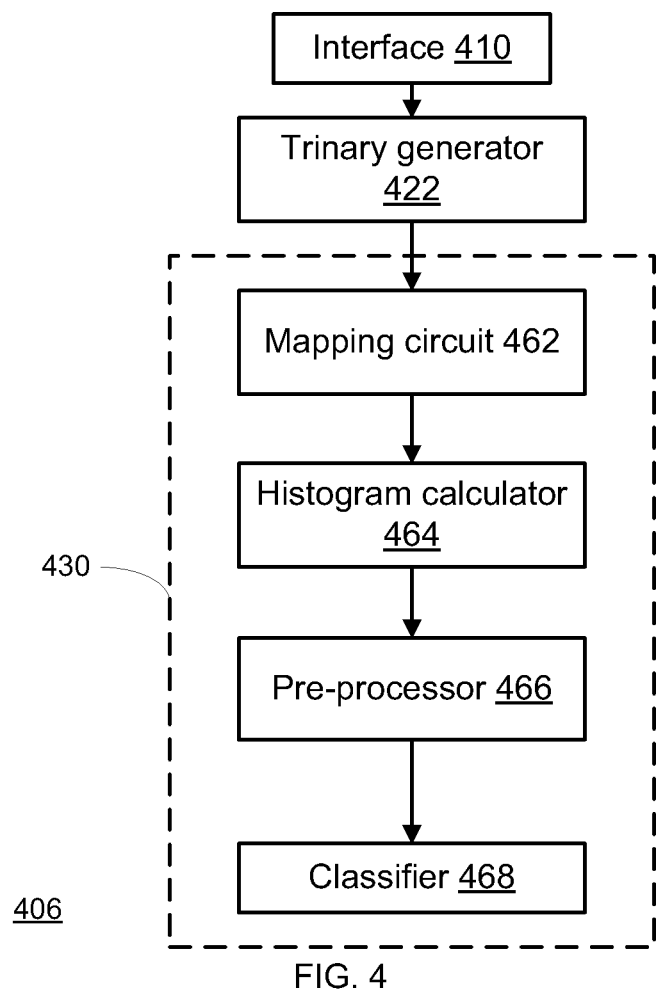
FIG. 4 illustrates a system according to an embodiment of the invention.

Referring back to the example set forth in FIG. 4, the motion detector 430 may include a mapping circuit 462 that is arranged to generate positive sets of binary digits by zeroing negative trinary digits; generate negative sets of binary digits by zeroing positive trinary digits. Referring to the example set fourth in FIG. 7, the set 301 of trinary digits that includes the values 1, −1, 1,0,1,−1,1,1 is mapped to a positive set 302 of binary digits that include the values 1,0,1,0,1,0,1,1 and to a negative set 303 of binary digits that include the values 0,−1, 0,0,0,−1,0,0. It is noted that both positive sets of binary digits, or negative sets of binary digits can be processed or only one type of binary sets can be processed.

The motion detector 430 may also include a histogram calculator 464 that is adapted to calculate histograms that represent values of positive sets of binary digits and represent values of negative sets of trinary digits. An example of such a histogram 300 is illustrated in FIG. 7.

Referring back to FIG. 4, the histogram calculator 464 may be arranged to calculate the histograms for each frame or for each sub-frame of each frame.

The motion detector 430 may include a pre-processor 466 and a classifier 468.

The pre-processor 466 is arranged to calculate a data structure that represents the values of the histograms of each sub-frame. Each histogram can be represented by a vector (or other data structure) that includes the population of each bin of the histogram.

The classifier 468 is arranged to classify the data structure to detect motion—especially it classifies every short video sequence (at several time scales) into action bearing short video sequence and non-action bearing short video sequence. As the motion timing is not known in advance the analysis of different video sequences can increase the chances of detecting motion.

The histogram calculator 464 may be arranged to calculate the histograms for each sub-frame of each frame.

The pre-processor 466 may be arranged to calculate a data structure that represents the values of the histograms of each sub-frame.

The classifier 468 may be arranged to classify the data structure to detect motion.

The classifier 468 may be a linear Support Vector Machine (SVM) classifier.

The system can process frames in a sequential manner—one frame at the time. Alternatively, the system can process frames in parallel or at least in a pipelined manner in which multiple frames are processed in parallel or in at least an overlapping manner. The parallel or pipelined processing of frames allows a detection of motion in one out of multiple detected frames.

This can be helpful, for example, when the expected time or place of motion is not known.

Figure 8:
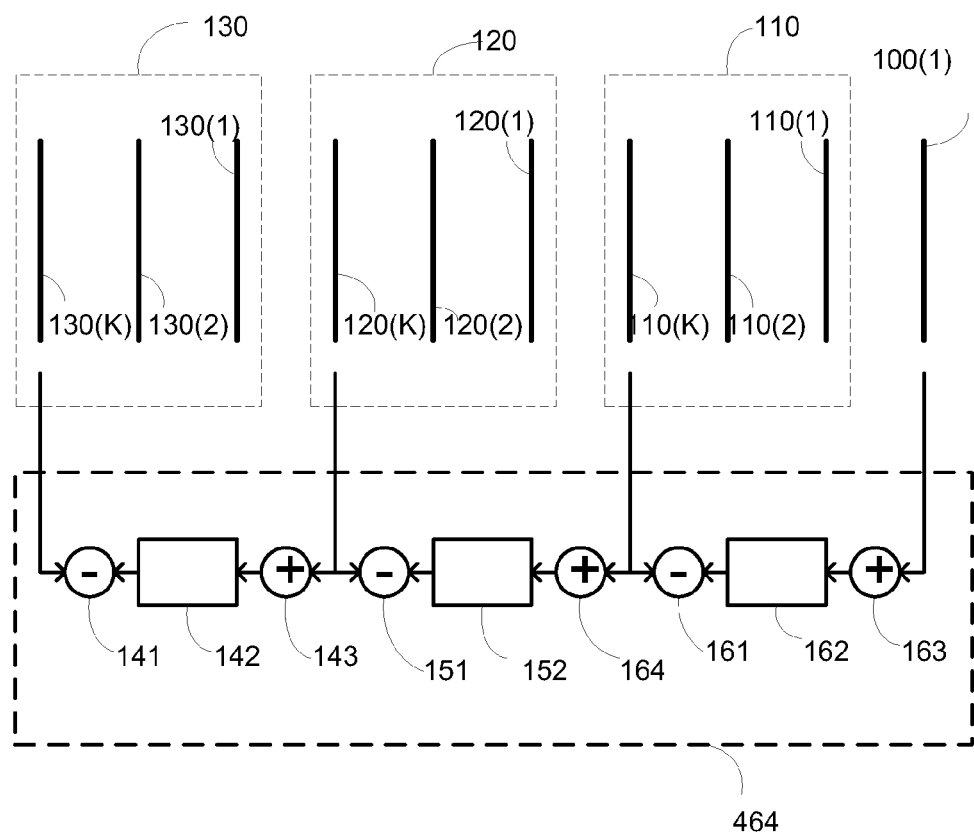
FIG. 8 illustrates multiple frames and multiple histogram calculators according to an embodiment of the invention.

An example of a histogram calculator 464 that can calculate histograms of multiple frames in a pipelined manner is illustrated in FIG. 8.

Histogram calculator 464 is fed with a sequence of frames. In FIG. 8 the sequence of frames includes frames 110(1), 110(2) till 110(K) of a first time slice 110, frames 120(1), 120(2) till 120(K) of a second time slice 120, and frames 130(1), 130(2) till 130(K) of a third time slice 130. FIG. 8 also illustrates a new frame 100(1).

Before new frame 100(1) appears the histogram calculator 464 calculates the histograms of the first time slice 110 from frames 110(1), 110(2) till 110(K), calculates the histograms of the second time slice 120 from frames 120(1), 120(2) till 120(K), and the histograms of the third time frame 130 from frames 130(1), 130(2) till 130(K). The calculation includes aggregating the histograms of corresponding sub-frames (that are located at the same locations but at different frames) of frames that belong to the same time slice.

When new frame 100(1) arrives, the partition between the time slices changes—new frame 100(1) becomes the first frame of first time frame 110, frame 110(K) becomes the first frame of second time slice 120, frame 120(K) becomes the first frame of third time slice 130 and frame 130(K) exits the third time slice 130.

Instead of re-calculating the entire histograms, adder 163, histogram calculator circuit 162 and subtraction circuit 161 update the aggregate of histograms of the first time slice by deleting (161) the values of frame 100(K) and by adding (163) to the histogram the values of frame 100(1). The same update is executed by adder 153, histogram calculator circuit 152 and subtraction circuit 151, and by adder 143, histogram calculator circuit 142 and subtraction circuit 141.

FIG. 3 illustrates a system 406 in which the generator is a is a pair generator 424 that is arranged to generate a first set and a second set of binary digits for each pixel of multiple pixels of each frame of the multiple frames; wherein a combination of the first set and the second set of binary digits represent a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of trinary digits to detect motion.

Pair generator 424 can generate sets of binary digits wherein each pair of first set binary digit and second set binary digit that are associated with the same pixel represent a relationship between (a) a first similarity between the patch and a next patch of the set of patches of the next frame; and (b) a second similarity between the patch and a previous patch of the set of patches of the previous frame, wherein the next patch and the previous patch are located at the same location.

Conveniently, the pair generator 424 may be arranged to: (a) assign a first value to the first set binary digit if the first similarity is substantially equal to the second similarity; (b) assign a second value to the first set binary digit if the first similarity substantially differs from the second similarity; (c) assign a first value to the second set binary digit if the second similarity is more significant that the first similarity; and (d) assign a second value to the second set binary digit if the second similarity is less significant that the first similarity.

Figure 9:
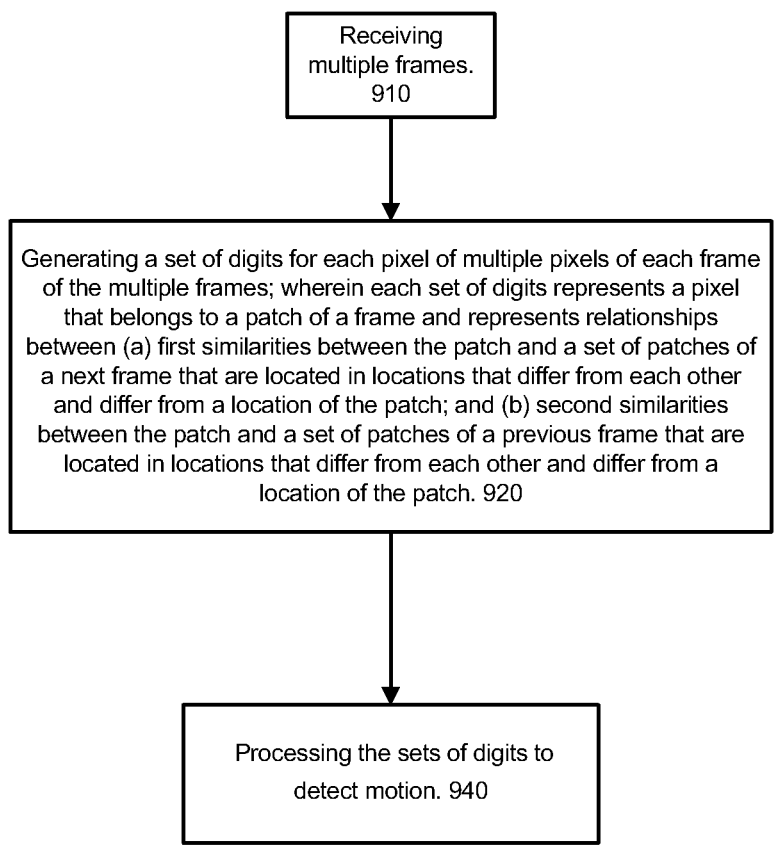
FIG. 9 illustrates a method according to an embodiment of the invention.

FIG. 9 illustrates method 900 for motion detection according to an embodiment of the invention.

Method 900 starts by stage 910 of receiving multiple frames. These frames may form a video stream. The frames may be filtered so that only selected frames are being further processed during method 900. For example, only 3 frames per time slice may be selected. The filtering (selection) of frames may be responsive to required motion detection accuracy level.

The length of a time slice may be selected in response to the expected length of the motion. For example, a time slice may include about 10 frames. Out of these 10 frames a current frame, 3 previous frames and 3 next frames can be evaluated.

Stage 910 is followed by stage 920 of generating a set of digits for each pixel of multiple pixels of each frame of the multiple frames; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch.

Stage 920 can include generating a set of digits for each pixel of multiple pixels of each frame of the multiple frames, wherein each set of digits represents a pixel that belongs to a patch of a frame and represents relationships between (a) first similarities between the patch and a set of patches of the next frame that differ from each other and surround a location that corresponds to the location of the pixel; and (b) second similarities between the patch and a set of patches of the previous frame differ from each other and surround a location that corresponds to the location of the pixel. A non-limiting example of such patches is illustrated in FIG. 5.

It is noted that all the pixels can be represented by sets of digits but this is not necessarily so. Thus, only a portion of pixels of a video stream can be processed.

Stage 920 is followed by stage 940 of processing the sets of digits to detect motion.

Figure 10:
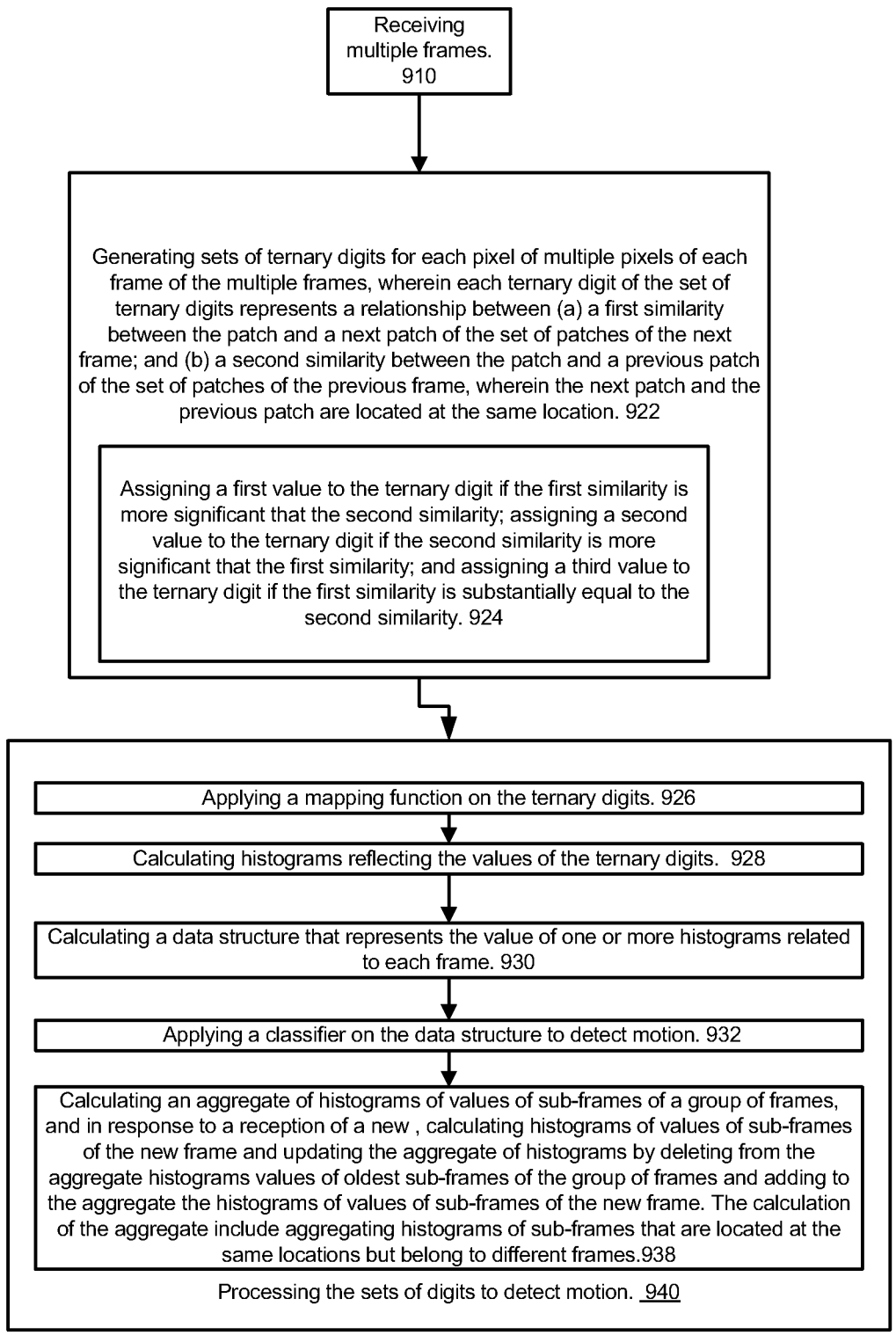
FIG. 10 illustrates a method according to an embodiment of the invention.

FIG. 10 illustrates method 902 according to an embodiment of the invention.

Method 902 starts by stage 910 of receiving multiple frames. These frames may form a video stream. The frames may be filtered so that only selected frames are being further processed during method 900. For example, only 3 frames per time slice may be selected. The filtering (selection) of frames may be responsive to required motion detection accuracy level.

Stage 910 is followed by stage 922 of generating sets of trinary digits for each pixel of multiple pixels of each frame of the multiple frames, wherein each trinary digit of the set of trinary digits represents a relationship between (a) a first similarity between the patch and a next patch of the set of patches of the next frame; and (b) a second similarity between the patch and a previous patch of the set of patches of the previous frame, wherein the next patch and the previous patch are located at the same location.

Referring to the example set forth in FIG. 5, pixel 2 of patch 21 can be represented by a set of eight trinary digits—indicative of the relationship between patch 21 and the eight pairs of corresponding patches {(12, 22), (13,33), (14,34), (15,35), (16,36), (17,37), (18,38) and (19,39)} of previous frame 10 and next frame 30.

Stage 922 may include stage 924 of assigning a first value to the trinary digit if the first similarity is more significant that the second similarity; assigning a second value to the trinary digit if the second similarity is more significant that the first similarity; and assigning a third value to the trinary digit if the first similarity is substantially equal to the second similarity.

Stage 922 may include calculating the first and second similarities by applying a Sum of Square Differences (SSD) function on pixels of patches.

The first value can be a positive value, the second value can be a negative value and the third value can be zero. Thus, stage 924 can include assigning a positive value to the trinary digit if the first similarity is more significant that the second similarity; assigning a negative value to the trinary digit if the second similarity is more significant that the first similarity; and assigning a zero value to the trinary digit if the first similarity is substantially equal to the second similarity.

Stage 922 is followed by stage 940 of processing the sets of digits to detect motion. Stage 940 may include stages such as 926, 928, 930, 932, 938 or a combination thereof.

Stage 926 may include applying a mapping function on the trinary digits. For example, stage 926 may include generating positive sets of binary digits by zeroing negative trinary digits and generating negative sets of binary digits by zeroing positive trinary digits.

Stages 922, 924 or stage 926 may be followed by stage 928 of calculating histograms reflecting the values of the trinary digits. In the example of FIG. 10, stage 928 is illustrated as preceded by stage 926. In this case stage 928 may include calculating histograms that represent values of positive sets of binary digits and represent values of negative sets of trinary digits.

Figure 6:
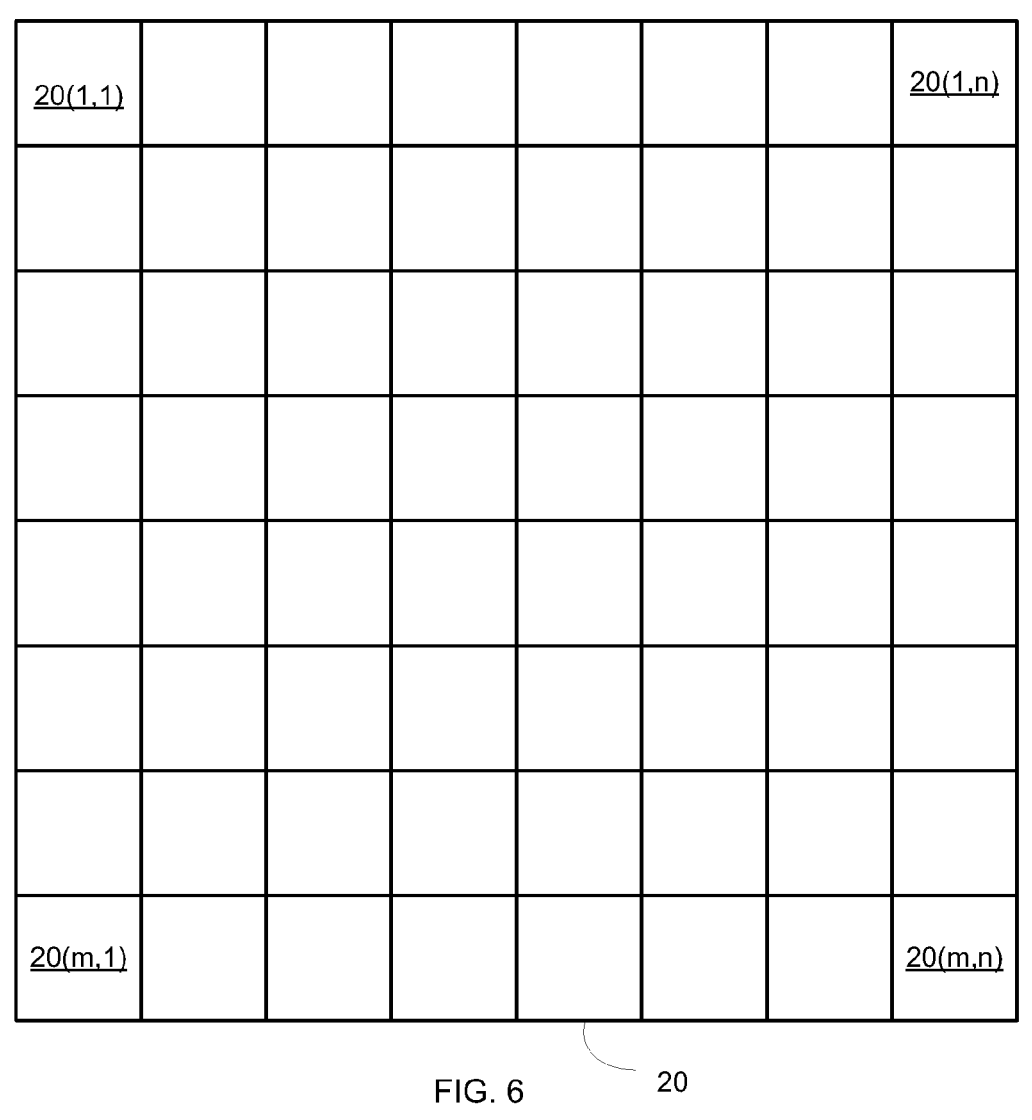

According to an embodiment of the invention each frame is partitioned to sub-frames (referring to FIG. 6, frame 20 is partitioned to n×m sub-frames 20(1,1)-20(m,n)) and stage 928 may include calculating a histogram per each sub-frame. Accordingly, n×m histograms may be calculated for frames such as frame 20. The values n and m can differ from each other or be equal to each other. For example either one can be equal to 2, 3 or 4.

Stage 928 is followed by stage 930 of calculating a data structure that represents the value of one or more histograms related to each frame. If, for example, a histogram is calculated per each sub-frame, then stage 930 includes calculating a data structure that represents the values of the histograms of each sub-frame.

Stage 930 may include at least one out of concatenating histograms to provide a vector, normalizing the vector and performing an element-wise square-root operator on the elements of the vector.

Stage 930 may be followed by stage 932 of applying a classifier on the data structure to detect motion. Stage 932 may include classifying every short video sequence (at several time scales) into action bearing short video sequence and non-action bearing short video sequence.

Stage 932 may include applying a Support Vector Machine (SVM) classifier.

The sequence of stages 920 and 940 can be applied on multiple frames. Thus, motion can be detected in one or more locations—in one or more frame sequences. These stages can be applied in a sequential manner—one frame at the time.

Alternatively, these stages can be applied in parallel or at least pipelined manner in which multiple frames are processed in parallel or in at least an overlapping manner. The parallel or pipelined processing of frames allows a detection of motion in one out of multiple detected frames. This can be helpful, for example, when the expected time or place of motion is not known. An example of a pipelined calculation is illustrated by stage 938 of calculating an aggregate of histograms of values of sub-frames of a group of frames, and in response to a reception of a new stage, calculating histograms of values of sub-frames of the new frame and updating the aggregate of histograms by deleting from the aggregate histograms values of oldest sub-frames of the group of frames and adding to the aggregate the histograms of values of sub-frames of the new frame. The calculation of the aggregate include aggregating histograms of sub-frames that are located at the same locations but belong to different frames.

Figure 11:
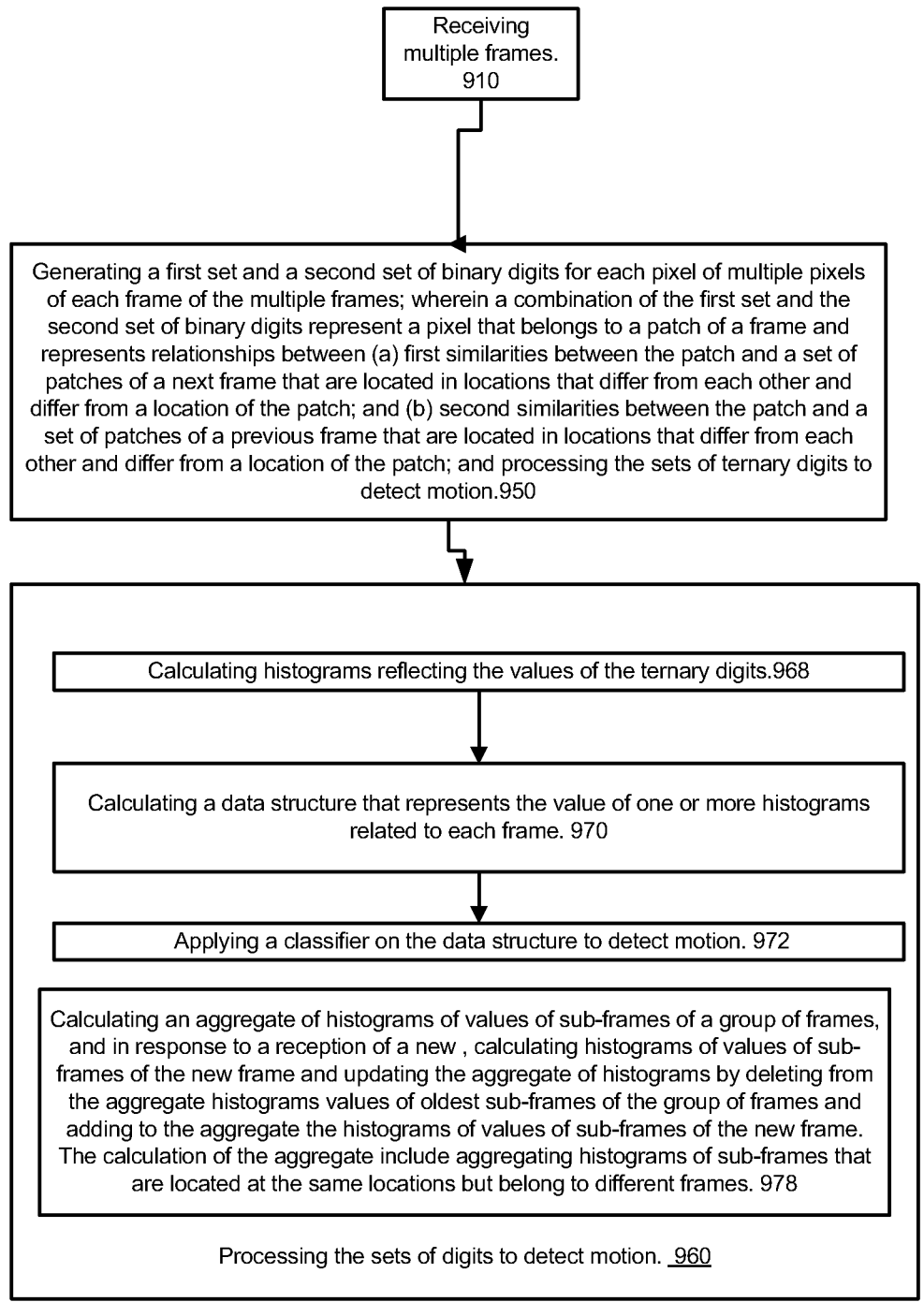
FIG. 11 illustrates a method according to an embodiment of the invention.

FIG. 11 illustrates method 904 for motion detection according to an embodiment of the invention.

Method 904 differs from method 902 by calculating two sets of binary digits instead one set of trinary digits. The first binary digits will indicate whether the first and second similarities substantially differ for each other or are substantially equal to each other. The second binary digits will indicate—if the similarities substantially differ from each other, which is the larger similarity. It is noted that a threshold may be set in order to determine if the similarities substantially differ from each other (the difference exceeds the threshold) or are substantially similar to each other (the difference is below the threshold). In a 0-255 value range the threshold can be set to, for example, 1000.

Method 904 starts by stage 910 of receiving multiple frames. These frames may form a video stream. The frames may be filtered so that only selected frames are being further processed during method 900. For example, only 3 frames per time slice may be selected. The filtering (selection) of frames may be responsive to required motion detection accuracy level.

Stage 910 is followed by stage 950 of generating a first set and a second set of binary digits for each pixel of multiple pixels of each frame of the multiple frames; wherein a combination of the first set and the second set of binary digits represent a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of trinary digits to detect motion.

Each pair of first set binary digit and second set binary digit that are associated with the same pixel may represent a relationship between (a) a first similarity between the patch and a next patch of the set of patches of the next frame; and (b) a second similarity between the patch and a previous patch of the set of patches of the previous frame, wherein the next patch and the previous patch are located at the same location.

Stage 950 may include assigning a first value to the first set binary digit if the first similarity is substantially equal to the second similarity; assigning a second value to the first set binary digit if the first similarity substantially differs from the second similarity; assigning a first value to the second set binary digit if the second similarity is more significant that the first similarity; and assigning a second value to the second set binary digit if the second similarity is less significant that the first similarity.

Stage 950 may include calculating the first and second similarities by applying a Sum of Square Differences (SSD) function on pixels of patches.

Stage 950 may be followed by stage 960 of processing the sets of digits to detect motion.

Stage 960 may include either one of stages 968, 970, 972, 978 or a combination thereof.

Stage 968 may include calculating histograms reflecting the values of the trinary digits.

According to an embodiment of the invention stage 968 may include calculating a histogram per each sub-frame of a frame.

Stage 968 is followed by stage 970 of calculating a data structure that represents the value of one or more histograms related to each frame. If, for example, a histogram is calculated per each sub-frame, then stage 970 includes calculating a data structure that represents the values of the histograms of each sub-frame.

Stage 970 may include at least one out of concatenating histograms to provide a vector, normalizing the vector and performing an element-wise square-root operator on the elements of the vector. The element-wise square-root operator can provide an approximation of the Bhattacharyya coefficients.

Stage 970 may be followed by stage 972 of applying a classifier on the data structure to detect motion.

Stage 972 may include applying a Support Vector Machine (SVM) classifier.

The sequence of stages 950 and 960 can be applied on multiple frames. Thus, motion can be detected in one or more locations. These stages can be applied in a sequential manner—one frame at the time. Alternatively, these stages can be applied in parallel or at least pipelined manner in which multiple frames are processed in parallel or in at least an overlapping manner. An example of a pipelined calculation is illustrated by stage 978 of calculating an aggregate of histograms of values of sub-frames of a group of frames, and in response to a reception of a new stage, calculating histograms of values of sub-frames of the new frame and updating the aggregate of histograms by deleting from the aggregate histograms values of oldest sub-frames of the group of frames and adding to the aggregate the histograms of values of sub-frames of the new frame. The calculation of the aggregate include aggregating histograms of sub-frames that are located at the same locations but belong to different frames.

The methods illustrated above were compares to other prior art motion detection methods. For example, the suggested method was compared to various prior art motion recognition methods and provided superior performance when tested against the Holleywood human action dataset, the kissing and slapping dataset, the UFC dataset, the KTH dataset and the Wiezmann dataset.

According to an embodiment of the invention the method was applied to detect micro-expressions. Frames that included one or more faces were processed by detecting the portion of the image that include a face and processing this portion. The suggested method achieved better performance in relation to the experiment described in the following paper "Non-rigid registration using free-form deformations for recognition of facial actions and their temporal dynamics", S. Koelstra and M. Pantic, In Proc. IEEE Conf. Face and Gesture Recognition, pages 1-8, 2008.

Instruction for executing either one of the mentioned above method or any combination of the stages of these methods can be stored in a non-transitory computer readable medium such as a disk, a tape, diskette, an integrated circuit and the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for motion detection, the method comprises: receiving multiple frames;
generating a set of digits for each pixel of multiple pixels of each frame of the multiple frames to provide sets of digits; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch;
and
processing the sets of digits to detect motion;
wherein the generating of the sets of digits comprises generating sets of trinary digits;
wherein each trinary digit of the set of trinary digits represents a relationship between (a) a first similarity between the patch and a next patch of the set of patches of the next frame; and (b) a second similarity between the patch and a previous patch of the set of patches of the previous frame, wherein the next patch and the previous patch are located at the same location;
wherein the generating of sets of trinary digits comprises:
assigning a first value to the trinary digit if the first similarity is more significant that the second similarity;
assigning a second value to the trinary digit if the second similarity is more significant that the first similarity; and
assigning a third value to the trinary digit if the first similarity is equal to the second similarity.

2. A method for motion detection, the method comprises: receiving multiple frames;
generating a set of digits for each pixel of multiple pixels of each frame of the multiple frames to provide sets of digits; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch;
and
processing the sets of digits to detect motion;
wherein the generating of the sets of digits comprises generating sets of trinary digit wherein each trinary digit of the set of trinary digits represents a relationship between (a) a first similarity between the patch and a next patch of the set of patches of the next frame; and (b) a second similarity between the patch and a previous patch of the set of patches of the previous frame, wherein the next patch and the previous patch are located at the same location;
wherein the generating of sets of trinary digits comprises:
assigning a positive value to the trinary digit if the first similarity is more significant that the second similarity;
assigning a negative value to the trinary digit if the second similarity is more significant that the first similarity; and
assigning a zero value to the trinary digit if the first similarity is equal to the second similarity.

3. The method according to claim 2, comprising:
generating positive sets of binary digits by zeroing negative trinary digits;
generating negative sets of binary digits by zeroing positive trinary digits; and
calculating histograms that represent values of positive sets of binary digits and represent values of negative sets of binary digits.

4. The method according to claim 3, comprising calculating the histograms for each sub-frame of each frame.

5. The method of claim 4, comprising calculating a data structure that represents the values of the histograms of each sub-frame; and applying a classifier on the data structure to detect motion.

6. The method according to claim 3 comprising calculating the histograms for each sub-frame of each frame.

7. The method of claim 6, comprising calculating a data structure that represents the values of the histograms of each sub-frame; and applying a classifier on the data structure to detect motion.

8. The method according to claim 7, wherein the classifier is a linear Support Vector Machine (SVM) classifier and wherein the first similarities are calculated by applying a Sum of Square Differences (SSD) function on pixels of patches.

9. The method according to claim 1, wherein the processing comprises calculating an aggregate of histograms of values of sub-frames of a group of frames of the multiple frames; receiving a new frame; calculating histograms of values of sub-frames of the new frame; updating the aggregate of histograms by deleting from the aggregate histograms values of oldest sub-frames of the group of frames and adding to the aggregate the histograms of values of sub-frames of the new frame.

10. A method for motion detection, the method comprises: receiving multiple frames;
generating a set of digits for each pixel of multiple pixels of each frame of the multiple frames to provide sets of digits; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch;
and
processing the sets of digits to detect motion;
wherein the generating of the set of digits comprises generating a first set and a second set of binary digits for each pixel of multiple pixels of each frame of the multiple frames; wherein a combination of the first set and the second set of binary digits represent a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of trinary digits to detect motion; wherein each pair of first set binary digit and second set binary digit that are associated with the same pixel represent a relationship between (a) a first similarity between the patch and a next patch of the set of patches of the next frame; and (b) a second similarity between the patch and a previous patch of the set of patches of the previous frame, wherein the next patch and the previous patch are located at the same location;

wherein the generating of the set of digits comprises assigning a first value to the first set binary digit if the first similarity is equal to the second similarity;

assigning a second value to the first set binary digit if the first similarity differs from the second similarity;

assigning a first value to the second set binary digit if the second similarity is more significant that the first similarity; and assigning a second value to the second set binary digit if the second similarity is less significant that the first similarity.

11. A system, comprising:

an interface for receiving multiple frames;

a generator adapted to generate a set of digits for each pixel of multiple pixels of each frame of the multiple frames to provide sets of digits; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and a motion detector for processing the sets of digits to detect motion;

wherein the trinary generator is arranged to assign a first value to the trinary digit if the first similarity is more significant that the second similarity; assign a second value to the trinary digit if the second similarity is more significant that the first similarity; and assign a third value to the trinary digit if the first similarity is equal to the second similarity;

wherein the trinary generator is arranged to assign a first value to the trinary digit if the first similarity is more significant that the second similarity; assign a second value to the trinary digit if the second similarity is more significant that the first similarity; and assign a third value to the trinary digit if the first similarity is equal to the second similarity; and wherein the trinary generator is arranged to assign a first value to the trinary digit if the first similarity is more significant that the second similarity; assign a second value to the trinary digit if the second similarity is more significant that the first similarity; and assign a third value to the trinary digit if the first similarity is equal to the second similarity.

12. A system, comprising:

an interface for receiving multiple frames;

a generator adapted to generate a set of digits for each pixel of multiple pixels of each frame of the multiple frames to provide sets of digits; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and a motion detector for processing the sets of digits to detect motion;

wherein the trinary generator is arranged to assign a first value to the trinary digit if the first similarity is more significant that the second similarity; assign a second value to the trinary digit if the second similarity is more significant that the first similarity; and assign a third value to the trinary digit if the first similarity is equal to the second similarity;

wherein the trinary generator is arranged to assign a first value to the trinary digit if the first similarity is more significant that the second similarity; assign a second value to the trinary digit if the second similarity is more significant that the first similarity; and assign a third value to the trinary digit if the first similarity is equal to the second similarity; and wherein the trinary generator is arranged to assign a positive value to the trinary digit if the first similarity is more significant that the second similarity; assign a negative value to the trinary digit if the second similarity is more significant that the first similarity; and assign a zero value to the trinary digit if the first similarity is equal to the second similarity.

13. The system according to claim 12, comprising a mapping circuit that is arranged to generate positive sets of binary digits by zeroing negative trinary digits; generate negative sets of binary digits by zeroing positive trinary digits; wherein the system further comprises a histogram calculator that is adapted to calculate histograms that represent values of positive sets of binary digits and represent values of negative sets of trinary digits.

14. The system according to claim 13, wherein the histogram calculator is arranged to calculate the histograms for each sub-frame of each frame.

15. A non-transitory computer readable medium that stores instructions for:

receiving multiple frames;

generating a set of digits for each pixel of multiple pixels of each frame of the multiple frames to provide sets of digits; wherein each set of digits represents a pixel that belongs to a patch of a frame and represents relationships between (a) first similarities between the patch and a set of patches of a next frame that are located in locations that differ from each other and differ from a location of the patch; and (b) second similarities between the patch and a set of patches of a previous frame that are located in locations that differ from each other and differ from a location of the patch; and processing the sets of digits to detect motion;

wherein the generating of the sets of digits comprises generating sets of trinary digits; wherein each trinary digit of the set of trinary digits represents a relationship between (a) a first similarity between the patch and a next patch of the set of patches of the next frame; and (b) a second similarity between the patch and a previous patch of the set of patches of the previous frame, wherein the next patch and the previous patch are located at the same location;

wherein the generating of sets of trinary digits comprises:

assigning a first value to the trinary digit if the first similarity is more significant that the second similarity;

assigning a second value to the trinary digit if the second similarity is more significant that the first similarity; and assigning a third value to the trinary digit if the first similarity is equal to the second similarity.

* * * * *